United States Patent

Scibbe et al.

[11] 4,057,199
[45] Nov. 8, 1977

[54] TENSIONLESS RETRACTOR

[75] Inventors: Harold R. Scibbe, Chardon; Edward J. Smith, Mentor, both of Ohio

[73] Assignee: REPA Feinstanzwerk GmbH, Industriegebiet, Germany

[21] Appl. No.: 662,555

[22] Filed: Mar. 1, 1976

[51] Int. Cl.² ............................ A67B 35/00; B65H 75/48
[52] U.S. Cl. .................................................. 242/107.7
[58] Field of Search ............ 242/107.6, 107.7, 107.12, 242/107.4 R, 107.4 E; 280/744–747; 297/388

[56] References Cited

U.S. PATENT DOCUMENTS

| | | | |
|---|---|---|---|
| 3,491,966 | 1/1970 | Curran et al. | 242/107.6 X |
| 3,682,412 | 8/1972 | Kuszynski | 242/107.6 X |
| 3,700,184 | 10/1972 | Francis | 242/107.6 X |
| 3,834,646 | 9/1974 | Heath | 242/107.7 |
| 3,869,098 | 3/1975 | Sprecher | 242/107.6 X |

*Primary Examiner*—Stanley N. Gilreath
*Assistant Examiner*—John M. Jillions

[57] ABSTRACT

A retractor including a reel normally biased in a direction tending to wind a belt (such as an automobile belt) around the reel, and including apparatus for placing the retractor in a tensionless condition. A locking surface is fixed to the reel and a locking member is biased toward engagement with the locking surface to resist rotation of the reel in a belt winding direction. A control member is movable in the path of movement of the locking member, and includes a first portion which holds the locking member out of engagement with the locking surface and a second portion which cooperates with the locking member and allows the locking member to engage the locking surface. Gate means are mounted on the control member and are movable relative to the control member into a first position holding the locking member from engagement with the locking surface during a preselected range of movement of the control member relative to the locking member. The gate means are movable relative to the control member into a second position allowing cooperation of the locking member with the second portion of the control member in response to a predetermined sequence of movements of the control member relative to the locking member so that the locking member can engage the locking surface and prevent rotation of the reel in the belt winding direction. Also, according to the invention, a seat belt retractor is placed in a tensionless condition in response to the rotation of the reel as the belt is protracted to a desired degree, allowed to retract, protracted slightly further, and then allowed to retract again.

15 Claims, 6 Drawing Figures

BELT RETRACTION POSITION

TENSIONLESS POSITION

BELT RETRACTING POSITION

BELT PROTRACTING POSITION

TENSIONLESS RETRACTOR

BACKGROUND OF THE INVENTION

This application relates to belt retractors of the type in which a reel is normally spring biased in a direction tending to wind a belt around the reel. Such retractors are presently being widely used in connection with automobile seat belts. The present invention particularly relates to belt retractors of the so-called "tensionless" type which are designed to be placed in a condition in which retraction of the belt is blocked.

Many well known types of automobile seat belt systems employ belt retractors in which torsion springs continually bias the reel in a direction tending to wind the belt around the reel. These types of retractors are desirable because when the seat belt is unbuckled and released the belt is automatically wound about the reel. The belt remains in the wound condition until it is protracted and buckled about a wearer. When the belt has been extended about the wearer and buckled the belt is continually biased into a snug fit about the wearer.

Experience has shown, however, that many people object to continually feeling the rewind force exerted on the belt, and such people may be reluctant to make use of such a seat belt. Therefore, various types of mechanisms have been designed for placing the seat belt system in a "tensionless" condition, a condition in which the rewinding of the belt under the bias of the spring is resisted. Many people find this a more comfortable type of seat belt since they are not constantly subjected to the rewind force exerted on the belt. Consequently, such people are more likely to make use of seat belts having this feature.

One type of tensionless retractor is shown in U.S. Pat. No. 3,851,836. In this patent a control disc is frictionally clutched to the reel. The control disc includes recesses which cooperate with a locking pawl and allow the locking pawl to engage ratchet teeth on the reel to lock the reel against rewinding. Also included in this reference are a pair of surfaces on the control disc which serve to engage the pawl and maintain the locking pawl out of engagement with the ratchet teeth. According to this disclosure the reel, after initial protraction, is in one of two conditions; (1) a condition in which during the initial retraction the locking pawl automatically engages the ratchet teeth and locks the reel against further retraction, or (2) a condition in which after the belt has been retracted to a snug position about the wearer the belt must be slightly protracted and then allowed to retract in order to allow the locking pawl to engage the ratchet teeth and place the belt in a tensionless condition. Which condition the system is in depends solely on the rotational position of the surfaces when the belt is protracted to the desired length.

Another form of tensionless retractor is shown in U.S. Pat. No. 3,869,098. In this patent a pair of discs are provided, a first one of which is frictionally clutched to the reel, and the other of which is frictionally clutched to the first disc. These discs have fixed surfaces which cooperate with a locking pawl in a predetermined manner and are adapted for a predetermined amount of rotational movement relative to the reel and to each other so that a tensionless condition is reached only after the belt has been protracted, allowed to retract, then protracted very slightly, and then allowed to retract. U.S. Pat. No. 3,834,646 also discloses a pair of discs which cooperate with a locking pawl in a similar manner to place a retractor in a tensionless condition.

Another form of tensionless seat belt retractor is shown in U.S. Pat. No. 3,206,137. One or more pawls are pivotally mounted on the reel. A fixed locking member having a plurality of teeth is provided, and the pawls are biased into engagement with the teeth of the fixed locking member. The pawls ratchet over the teeth, and during initial retraction of the belt serve to engage appropriate teeth of the locking member to lock the reel against rewinding. In this patent, and in the aforementioned patents, the belt can be released from a tensionless condition and allowed to rewind under the influence of its rewind spring by simply protracting the belt further outwardly from its tensionless condition and then releasing the belt.

Another form of tensionless retractor is shown in U.S. Pat. No. 3,682,412. In this patent a stop is manually actuated to prevent retraction once the belt is pulled out to the desired length. To permit the belt to retract under the influence of its return spring this device is adapted to be manually deactivated.

Still other types of prior art retractors relate to mechanisms which are designed so that when a locking element is in a predetermined condition it prevents both retraction and protraction. Many of these require manual release of the locking element to allow the retractor to rewind under its spring bias.

SUMMARY OF THE INVENTION

According to the invention an axially extending reel is supported for rotation about its central axis, and is biased for rotation in one direction tending to wind a belt around the reel. A locking surface is fixedly mounted to the reel, and a locking member is biased toward engagement with the locking surface to resist rotation of the reel in the belt winding direction. A control member is movable in the path of movement of the locking member, and includes a first portion which holds the locking member out of engagement with the locking surface and a second portion which cooperates with the locking member and allows the locking member to engage the locking surface. Gate means are mounted on the control member and are movable relative thereto into a first position holding the locking member from engagement with the locking surface during a preselected range of movement of the control member relative to the locking member. The gate means are movable into a second position allowing cooperation of the locking member with the second portion of the control member in response to a predetermined sequence of movements of the control member relative to the locking member so that the locking member can engage the locking surface and prevent rotation of the reel in the belt winding direction.

According to the preferred embodiment a locking surface in the form of a series of teeth is fixed to the reel for rotation therewith, and a locking pawl is biased towards engagement with the teeth to lock the reel against retraction. A control member is provided in the form of a disc frictionally clutched to the reel for rotation therewith, and means are provided for limiting the degree to which the disc can be rotated in either direction. The disc includes an arcuate surface which engages the pawl and holds it out of engagement with the teeth and a recess which cooperates with the pawl and allows the pawl to engage the teeth and hold the reel against rotation in a direction which would wind a belt around the reel. A gate means is mounted on the disc and is movable relative to the disc in response to a predetermined sequence of rotational movements of the reel and the disc. The gate means is movable to a position in which it closes the recess and operates to hold the pawl in a condition in which it cannot engage the locking pawl in response to certain selected reel rotational movements. The gate means is also movable to an open position to allow the pawl to engage the teeth to place the reel in a tensionless condition in response to certain other selected reel rotational movements.

The gate means preferably takes the form of an elongated member pivotally mounted to the disc. Means are provided for pivoting the elongated member to a position in which it engages the pawl and holds the pawl out of engagement with the teeth in response to the belt being unwound by an amount and allowed to retract. The elongated member is designed to automatically move to a position allowing engagement of the pawl and the teeth in response to the belt being unwound by an additional selected amount and allowed to retract again. The disc and the elongated member are also designed so that the reel may be released from a tensionless condition by unwinding the belt a predetermined amount and allowing it to retract.

BRIEF DESCRIPTION OF THE DRAWINGS

The further advantages and objects of this invention will become further apparent from the following detailed description taken with reference to the accompanying drawings wherein.

DETAILED DESCRIPTION OF THE PREFERRED EMBODIMENT

Figure 1:
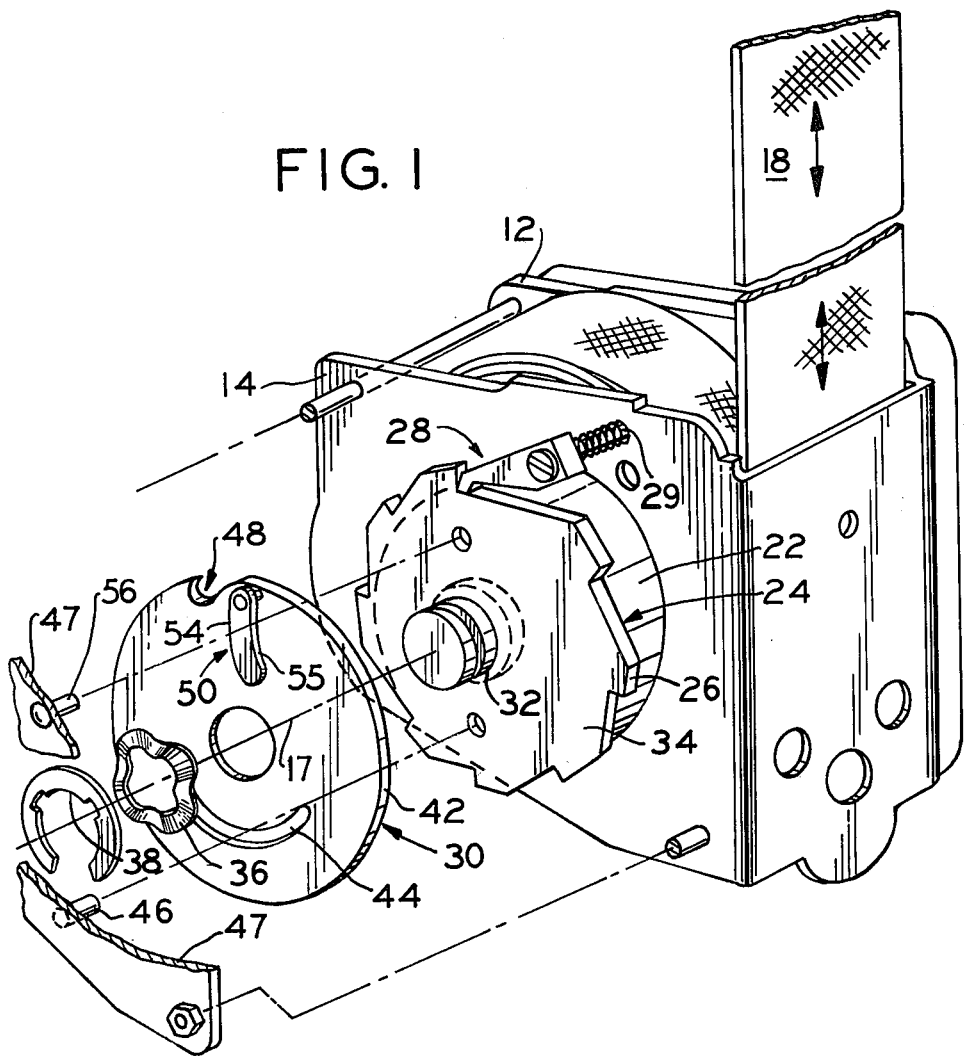
FIG. 1 is a perspective exploded view of a seat belt retractor embodying the principles of the present invention with portions omitted.

As noted above the present invention relates to a tensionless retractor designed principally for use in an automotive seat belt system. Referring to the drawings the retractor elements are enclosed within a housing 10. Spaced wall elements 12, 14 enclosed within the housing 10 support an axially extending cylindrical reel 16 for rotation about a central axis 17 thereof. The reel includes conventional means (not shown) for securing an end of an automotive seat belt 18 to the reel so that the belt is disposed to be either wound or unwound from the reel as the reel is rotated about its central axis 17. One end of the reel has an integral portion 19 extending outwardly of the wall element 12 and a torsion spring 20 is connected to the portion 19 and wound thereabout in a known manner. Torsion spring 20 biases the reel in a known manner in one rotational direction tending to wind the belt about the reel.

The other end of the reel includes the apparatus for placing the reel in a tensionless condition. Fixedly secured to the reel for rotation therewith is a locking surface which is shown as a disc 24 having a plurality of teeth 26. The reel 16 includes an integral portion 22 extending outwardly of the wall portion 14 and the disc 24 is fixedly connected to the reel portion 22. The disc 24 may be connected to the reel portion 22 in any suitable manner, such as by mechanical fastening means, by a suitable cement, or by any other comparable fastening means. It is also contemplated that the teeth 26 can be integrally formed in the reel portion 22.

Figure 3:
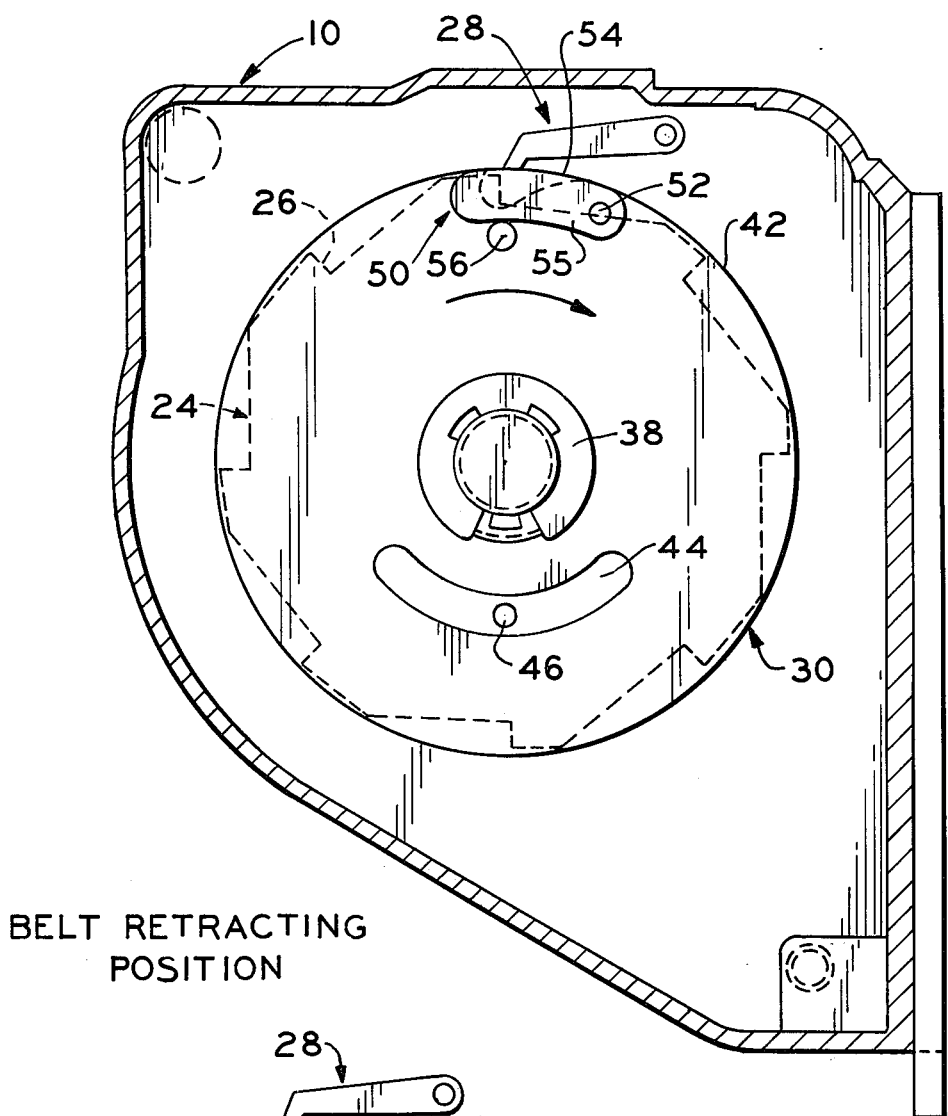
FIG. 3 is a cross sectional end view of the retractor of FIG. 2, taken from the direction 3—3.

A locking member is biased toward engagement with the teeth 26 to hold the reel against rotation in a rewind direction. In the illustrated embodiment the locking member includes a locking pawl 28 having a first end 46 pivotally connected to a portion of the housing. The other end of the pawl is biased toward engagement with the teeth 26 of the disc 24. If the pawl 28 is disposed above the teeth, as shown in FIG. 3, the pawl is biased toward engagement with the teeth by means of gravity. As shown in FIG. 1 the pawl 28 is also biased by torsion spring 29 toward engagement with the teeth 26. A spring bias is particularly necessary if the pawl is not disposed above the teeth 26.

A control member is provided, and includes a portion disposed in the path of movement of the locking member. The control member preferably includes a disc 30 frictionally engaging a portion of the reel. In the illustrated embodiment, the disc 30 is rotatably mounted on the hub 32 of the disc 24 and is biased into frictional engagement with a surface 34 of the disc 24 by means of a spring washer 36 held in place by a retaining ring 38. The disc includes an annular extension 40 which frictionally engages the surface 34 of disc 24. The surface area of the annular extension 40 is designed so that a predetermined amount of frictional engagement exists between the disc 30 and the reel portion 22. The frictional engagement of the disc 30 and the disc 24 means that rotation of the reel 16 in either direction rotates the disc 30 in the same direction.

The disc 30 includes an annular surface 42 disposed in the path of movement of a portion of the pawl 28. The radius of annular surface 42 is greater than the outer radius of disc 24 so that surface 42 engages the pawl and holds it out of engagement with the teeth 26 of disc 24. The disc 30 also includes a slot 44. A pin 46 is fixed to housing wall 47 and extends into the slot 44 to limit the range of rotation of the disc 30. Thus a predetermined arcuate portion of the annular surface 42 is designed to cooperate with the pawl 28. Formed within this arcuate portion of the annular surface 42 is a recess 48. The recess 48 is designed so that when the pawl 28 is allowed to drop into it the pawl can also engage the teeth 26 on the disc 24.

Figure 4:
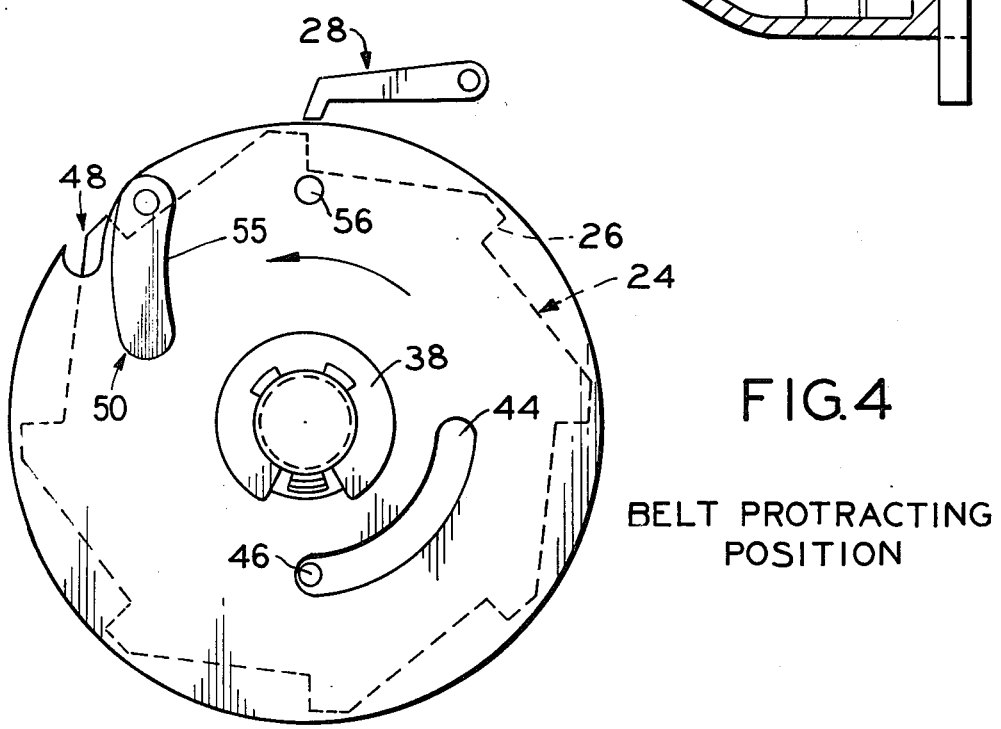

According to the present invention gate means are mounted on the disc 30 and are movable relative to the disc 30 to selectively open and close the recess 48 during selected ranges of rotation of the disc relative to the pawl 28. The gate means preferably takes the form of an elongated member 50 pivotally connected to a pin 52 which extends from surface 34 of the disc 24 and in a direction parallel to central axis 17. In response to selected rotational movements of the disc 30 the elongated member 50 hangs freely from the pivot pin 52 in the manner shown in FIGS. 4 through 6. In response to other selected movements of the disc 30 the elongated member 50 is moved to a closed position in which a surface 54 of the elongated member 50 engages the pawl 28 and holds it out of engagement with the teeth 26 as the recess 48 moves past the pawl 28, as shown in FIG. 3. The elongated member 50 is moved to the latter position by engagement of surface 55 of the elongated member with a pin 56 which is fixed to housing wall 47.

Figure 5:
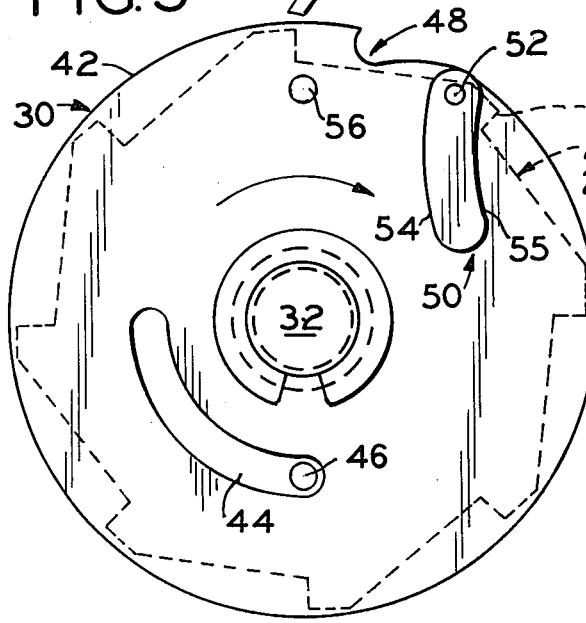
FIGS. 4, 5 and 6 are end views of a retractor viewed from directions similar to FIG. 3, with portions omitted, and illustrating the respective positions of the elements of the present invention during various rotational positions of the reel.

The manner in which the present invention places the reel in a tensionless condition may be appreciated by reference to FIGS. 3 through 6. When the belt is fully wound on the reel the relative positions of the elements are substantially as shown in FIG. 5. The pawl 28 engages a portion of the annular surface 42 and the gate member 50 hangs freely from the pivot pin 52. During initial protraction (unwinding) of the belt (in a counterclockwise direction when viewing FIGS. 3 through 6) the disc 30 is also rotated counterclockwise by its frictional engagement with the reel. The pawl 28 rides over the annular surface 42 and ratchets over the recess 48 and teeth 26 until the pin 46 engages one end of the slot 44. The disc 30 is then in the position shown in FIG. 4 and remains in that position during further rotation of the reel as the belt is fully protracted to the desired extent.

Once the belt has been so protracted and then allowed to retract (rewind) the disc 30 is rotated clockwise by its frictional engagement with the reel. During a portion of this retraction the surface 55 of the elongated member 50 engages pin 56 and pivots to a position (FIG. 3) in which its surface 54 engages the pawl 28 and prevents the pawl from dropping into the recess 48 as the recess 48 moves past the pawl. This means that after the initial protraction and during the initial retraction the pawl cannot drop into the recess and engage teeth 28 to resist further retraction of the belt under the influence of spring 29. The disc 30 rotates with the reel in the clockwise direction until the pin 46 engages the opposite end of the slot 44 (FIG. 5). At this point the pawl 28 is held away from the teeth 26 by the annular surface 42, and the elongated member 50 hangs freely from pin 52. The disc 30 remains in that position until the reel 16 has been rewound (by spring 20) to a position in which it snugly fits the wearer.

Figure 6:
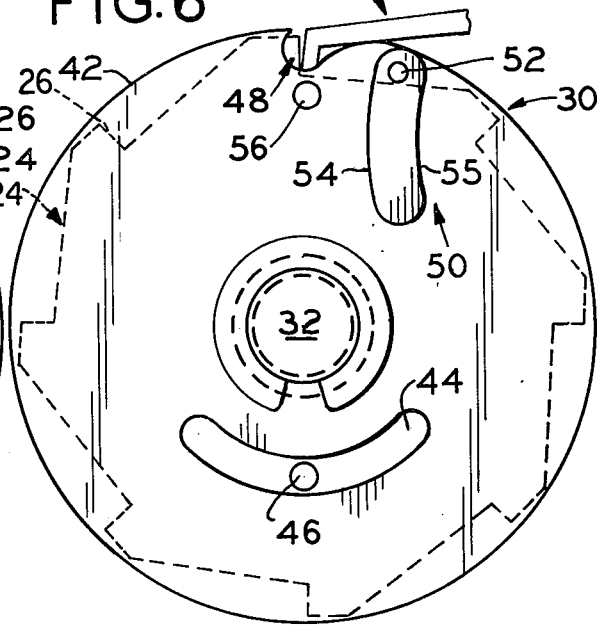
Figure 2:
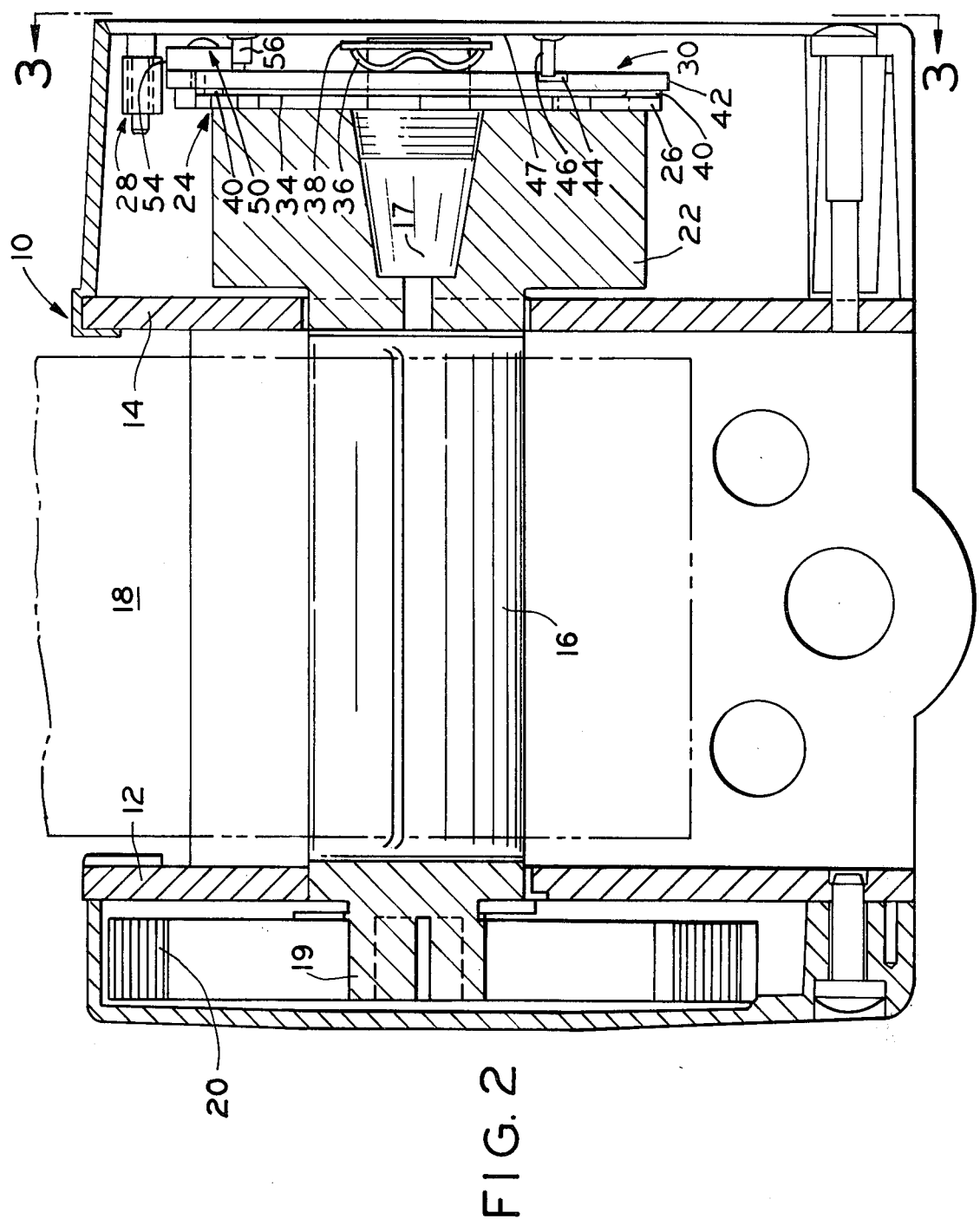
FIG. 2 is a cross sectional view of the retractor of FIG. 1, in one rotational position of the reel.

Thus far, the reel is in a position in which it is snugly held against the body of the wearer under the action of the torsion spring 20. In order to place the reel in a tensionless condition the belt must be protracted slightly further, such as with a simple shrug of the wearer's shoulders. This would rotate the reel 16 from the position of FIG. 5 slightly counterclockwise. The slight rotation must be far enough that the pawl 28 comes into alignment with the recess 48 and must not be far enough to bring the elongated gate member 50 past the pin 56 and into the FIG. 4 position. With this small amount of protraction the reel and the disc 30 are disposed so that when the belt is allowed to retract the recess 48 is not covered by the elongated member 50. During the latter retraction the pawl 28 is free to move into the recess and thereby into engagement with the teeth 26 on the disc 24. This position is shown in FIG. 6. The rewind bias of the torsion spring 20 is blocked and the belt is in a tensionless condition.

In order to release the belt from the tensionless condition the belt need only be protracted to rotate the reel far enough so that upon subsequent release the elongated gate member 50 pivots to the position of FIG. 3 to engage the pawl as the recess 48 moves past the pawl. The belt then rewinds under the influence of the torsion spring.

Once the belt has been protracted and then allowed to retract to the FIG. 5 position, if the wearer, in attempting to place the reel in a tensionless condition, were to subsequently protract the belt too far, the elongated gate member 50 would block engagement of the pawl 28 with the teeth of the disc 30 after the belt is released. This would again bring the elements into the FIG. 5 position. The belt need then be only protracted slightly further in the manner set forth above and then released to place the system in a tensionless condition.

In the illustrated embodiment the elongated gate member is mounted to the control member in a preselected positional relationship to the recess, and the pin 56 is disposed to cooperate with the elongated member to place the reel in a tensionless condition in the manner described above. However, it is contemplated that the length of the elongated gate member 50 and its position relative to the recess 48, and the position of the pin 56 may vary in accordance with the selected type of reel motions which are desired to place the system in a tensionless condition. Also, while the preferred embodiment contemplates a gate means in the form of an elongated member pivotally connected to the control member, other forms of gate means which operate in accordance with the principles of the present invention will be readily apparent to those of ordinary skill in the art. Similarly, while the preferred embodiment contemplates a fixed pin for engaging the gate means and moving it to a closed position in response to selected reel movements, other means for moving the gate means into its various positions will become readily apparent to those of ordinary skill in the art.

Thus, with the foregoing description in mind, many and varied applications of the principles of the present invention will become apparent to those of ordinary skill in the art.

Therefore what is claimed is:

1. Apparatus comprising an axially extending reel supported for rotation about a central axis thereof, means on said reel for engaging a portion of an automotive seat belt member, spring force applying means for biasing said reel in a first rotational direction tending to wind the belt member about the reel, said reel being rotatable in a second rotational direction against the bias of said spring force applying means to unwind the belt from said reel, means for resisting rotation of the reel in the first rotational direction comprising locking surface means fixedly connected to the reel, a locking member biased for movement into engagement with the locking surface means to resist rotation of said reel in said first direction, a control member comprising a disc member rotatable about said central axis for movement relative to said locking member, means for rotating said disc member in a predetermined manner in said first or second rotational directions in response to rotation of said reel in either said first or second rotational directions, said disc member having a surface portion engageable with said locking member to hold said locking member out of engagement with said locking surface, said disc member including a recess portion normally cooperable with said locking member to allow said locking member to move into engagement with said locking surface, gate means mounted on said disc member and including surface means selectively movable into a first position engaging said locking member and holding said locking member out of cooperation with said recess in response to a predetermined sequence of rotational movements of said reel and movable into a second position allowing said recess to cooperate with said locking member in response to a predetermined sequence of rotational movements of said reel.

2. Apparatus as set forth in claim 1 including means for moving said gate means to said first position after a predetermined amount of rotation of said reel in said second direction and during a subsequent predetermined range of rotation of said reel in said first direction.

3. Apparatus as set forth in claim 1 wherein said gate means comprises an elongated member pivotally mounted to said control member, means for pivoting said elongated member into engagement with said locking member in response to a predetermined sequence of rotational movements of said reel.

4. Apparatus as set forth in claim 3 including means for pivoting said elongated member to said first position after rotation of said reel in said second direction and during subsequent rotation of said reel in said first direction.

5. Apparatus as set forth in claim 4 wherein said means for pivoting said elongated member comprises a member mounted in a fixed positional relationship to said locking member and operative to engage said elongated member and pivot it to said first position during said subsequent rotation of said reel in said first direction.

6. Apparatus as set forth in claim 1 wherein said gate means includes an elongated member having an end portion pivotally mounted to said disc member, means mounted in a fixed positional relationship to the locking member and engageable with said elongated member during a preselected range of rotation of said reel to pivot said elongated member to a position engaging said locking member.

7. Apparatus as set forth in claim 6 wherein said end portion of said elongated member is pivotally mounted to said disc member in a selected positional relationship to said recess.

8. Apparatus as set forth in claim 7 including means for urging said disc member into frictional engagement with said reel so that said disc member is rotated concurrently with said reel as said reel is rotated in either said first or second directions, and means for limiting the range of rotation of said disc member in said first and second directions.

9. Apparatus comprising an axially extending reel supported for rotation about a central axis thereof, means on said reel for connecting an automotive seat belt thereto in a manner such that the belt is wound or unwound from the reel as the reel is rotated about its central axis, means for biasing said reel in a first direction tending to wind the belt about the reel, locking surface means fixedly connected to the reel, a locking member biased for movement toward a position in which it engages the locking surface means and resists rotation of said reel in said first direction, a control member positionable in the path of movement of a portion of said locking member and movable relative to the locking member, said control member comprising a first portion engageable with said locking member to hold the locking member out of engagement with said locking surface means and a second portion for allowing said locking member to move into engagement with said locking surface means, gate means mounted on said control member and movable relative thereto to a first position holding said locking member from movement into engagement with said locking surface means during a preselected range of movement of said control member relative to said locking member, said gate means being movable to a second position allowing the second portion of the control member to cooperate with the locking member to move into engagement with said locking surface means during a preselected sequence of movements of said control member relative to said locking member.

10. Apparatus as set forth in claim 9 wherein said gate means comprises an elongated member pivotally mounted to said control member, means for pivoting said elongated member into engagement with said locking member during a preselected range of movement of said control member relative to said locking member.

11. Apparatus as set forth in claim 10 wherein said means for pivoting said elongated member comprises a member mounted in a fixed positional relationship to said locking member and operative to engage said elongated member and pivot it to said first position during said preselected range of movement of said control member relative to said locking member.

12. Apparatus as set forth in claim 9 wherein said control member comprises a disc member rotatable about said central axis relative to said locking member, said disc member having a surface portion engageable with said locking member to hold said locking member out of engagement with said locking surface, said disc member including a recess portion normally cooperable with said locking member to allow said locking member to move into engagement with said locking surface, said gate means including surface means selectively movable into a first position engaging said locking member and holding said locking member out of cooperation with said recess during a preselected range of movement of said disc member relative to said locking member and movable into a second position allowing said recess to cooperate with said locking member in response to a predetermined sequence of rotational movements of said disc member relative to said locking member.

13. Apparatus as set forth in claim 12 wherein said gate means includes an elongated member having an end portion pivotally mounted to said disc member, means mounted in a fixed positional relationship to the locking member and engageable with said elongated member during said preselected range of rotation of disc member to pivot said elongated member to a position engaging said locking member.

14. Apparatus as set forth in claim 13 wherein said end portion of said elongated member is pivotally mounted to said disc member in a selected positional relationship to said recess.

15. Apparatus as set forth in claim 14 including means for urging said disc member into frictional engagement with said reel so that said disc is rotated concurrently with said reel as said reel is rotated about its central axis, and means for limiting the range of rotation of said disc.

* * * * *